United States Patent Office 3,658,988
Patented Apr. 25, 1972

3,658,988
CARRIER FOR PESTICIDAL COMPOSITIONS
Herbert B. Scher, Moraga, Calif., assignor to Stauffer
Chemical Company, New York, N.Y.
No Drawing. Filed Nov. 26, 1969, Ser. No. 880,403
Int. Cl. A01n *17/08, 13/00*
U.S. Cl. 424—128                                      7 Claims

ABSTRACT OF THE DISCLOSURE

A pesticidal composition consisting of a clay, a phosphate type toxicant and a stabilizer for said toxicant is described herein. The stabilizer is selected from a group consisting of sodium and potassium inorganic phosphates. The process of forming granules of said pesticidal composition is also defined herein.

BACKGROUND OF THE INVENTION

Among the many insecticidal compositions the alkylphosphonodithioates have been notably successful. These compounds are represented by the formula:

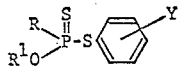

wherein R and $R^1$ are selected from the group consisting of methyl and ethyl and Y is selected from the group consisting of hydrogen and alkyl groups having up to four carbon atoms. These compounds are made by reacting the appropriate phosphonate with thiophenol in the presence of an alkali in an organic solvent. These compounds are described and claimed in U.S. Pat. No. 2,988,474 and sold under the trademark Dyfonate.

When used as insecticides, the compound may be applied as dispersions, as solutions in suitable solvents, such as acetone and the like, or preferably they may be mixed with an inert carrier and applied as a powder. For example, they may be made into the form of a wettable powder by the addition of a finely divided ground carrier or diluent such as attapulgite, kaolinite, montmorillonite, all finely divided clays, and each containing a suitable wetting agent such as higher aliphatic alcohol, sulfate wetting agents, or the like. The insecticidal active compound can be readily admixed with the clay compounds and formed into granular materials if desired.

While the insecticidal active compound has relatively high stability, it has been found that it decomposes when used in combination with the solid clay carriers. While it is not completely understood why this insecticidal composition decomposes on the clay carriers, it may be hypothesized that the decomposition of the insecticidal compound is caused by the tendency of the carrier surface to promote both the oxidation of the double bonded sulfur and/or the hydrolysis of the phosphorus-sulfur-carbon linkage, the latter mechanism of decomposition being particularly favored by the presence of divalent metal ions and acid sites resident on the heterogeneous clay surface.

Several attempts have been made to overcome this stability factor in the phosphonodithioate compounds when used with clays. These attempts include the treatment of the clay with organic bases such as tetra-substituted diamines, trilkanolamines, polyhydric alcohols, diacetone alcohols, fatty or resin acids, metal compounds and ozones, see U.S. Pat. No. 2,962,418. While this approach has met with some degree of success, the use of an organic base to stabilize the active insecticidal compound substantially increases the cost thereof because the procedure for employing these bases is rather complex.

BRIEF DESCRIPTION OF THE INVENTION

It has been discovered that the stability of the alkylphosphonodithioates can be substantially increased by employing an inorganic alkali metal phosphate compound intermixed with the solid inert clay carriers. The alkali metal phosphate compounds can be selected from the group consisting of sodium and potassium phosphates, consisting of a mixture of linear and cyclic phosphates.

DETAILED DESCRIPTION OF THE INVENTION

In the practice of the present invention, a suitable inert clay carrier is first obtained. The inert clay carriers can be selected from a group consisting of, attapulgite kaolinite, montmorillonite, and any mixtures thereof. The clay compositions will be in a finely divided form ranging in size between about 10 and 500 mesh. If desired, the clay compositions can be dried for up to about 24 hours at a temperature up to about 150° C.

Thereafter, the clay composition is prepared for pelletizing in a standard extrusion machine by adding thereto water to form a paste composition which can be extruded into pellet form. After the water has been added to the clay composition, the inorganic alkali metal phosphate compositions are added to this paste or water-clay compounds are readily soluble in water, they will be completely dispersed throughout the matrix of the water-clay combination. The clay, water and alkali metal phosphate combination will then be extruded into pellets ranging in size between about 10 and 100 mesh, and then dried to a water content of between about 1 and 10% by weight. The amount of alkali metal phosphate can be present in an amount ranging between about 0.1 and 20% by weight of the clay. The upper limit will of course depend on the toxicant level and cost of manufacture. The active insecticidal compound can then be sprayed on or dripped on or otherwise applied to the pellets in a conventional manner.

In the alternative, the clay compounds can first be pelletized in a conventional manner and then the alkali metal phosphate compounds can be dissolved in water and added to the pellets if desired. Thereafter, the insecticidal active compounds can be added in a conventional manner. Also, the clays can be treated with the alkali metal phosphates and insecticidal compounds and used in powder form if desired.

The alkali metal inorganic phosphate compositions useable with the present invention are the sodium and potassium derivatives of the reaction between food grade phosphoric acid and the appropriate salt by the thermal process. In its preferred form, the inert alkali metal inorganic phosphate is sodium hexametaphosphate, which is made from a food grade phosphoric acid and commercial soda ash by a thermal process. The reaction product from this process has been termed sodium hexametaphosphate, but consists of a mixture of linear and cyclic phosphates. It has a molecular ratio range of 1 $Na_2O$:1 $P_2O_5$ to 2 $Na_2O_2$:1 $P_5O_2$ with a guaranteed minimum of 67% $P_2O_5$. It is supplied in the form of a powder, of agglomerated particles, and of broken glass plates either pure or adjusted with mild alkali. It is completely soluble in water in all portions, but is insoluble in organic solvents. Such a product is commercially available and is sold under the trade name Calgon.

The granulated clays having incorporated therein the insecticidal compound and stabilizers are used by applying the same to the habitat of the insect. This can be brought about in any conventional manner.

In order to illustrate the merits of the present invention the following examples are provided:

EXAMPLE I

Kaolin was treated with sodium hexametaphosphate [1] by the following procedure. 100 grams of the powdered clay was dispersed in 250 ml. of distilled water to which 6 grams of sodium hexametaphosphate [1] was added. The clay was filtered and then dried at 115° C. for 3½ hours. The clay was then ground to 100/325 mesh and dried for 16 hours at 115° C. Water was then added to a portion of the clay to bring the water content to about 1.5% by weight. Dyfonate® formulations were made on a treated and untreated clay by adding Dyfonate® liquid to the 100/325 mesh clay sample in a glass bottle and rolling the sealed bottle for 4 hours. Both dry clay and clay containing 1.5% water were used. Thus, the treated clay contained 1.2 sodium hexametaphosphate [1] and 2% Dyfonate. The samples were then stored at 125 and 150° F. for 28 days, after which they were analyzed for Dyfonate content. The results of these tests are illustrated in Table I.

TABLE I

| Additives to clay | Percent Dyfonate on clay after 28 days | |
|---|---|---|
| | 125° F. | 150° F. |
| 2% Dyfonate plus 1.5% H₂O | 0.36 | 0.52 |
| 2% Dyfonate | 0.35 | 0.27 |
| 2% Dyfonate and 1.2% SHMP * plus 1.5% H₂O | 1.79 | 1.82 |
| 2% Dyfonate plus 1.2% SHMP * | 1.88 | 1.74 |

*Sold under trade name Calgon.

EXAMPLE II

Attapulgite clay was treated with sodium hexametaphosphate [1] by the following procedure. 100 grams of the powdered clay was dispersed in 250 ml. of distilled water to which 24 grams of sodium hexametaphosphate [1] was added. The clay was filtered and then dried at 150° C. for 3½ hours. The clay was then grounded to 100/325 mesh and dried for 16 hours at 115° C. Water was then added to a portion of the clay to bring the water content to a typical value. Dyfonate formulations were made on a treated and untreated clay by adding Dyfonate liquid to the 100/325 mesh clay sample in a glass bottle and rolling the sealed bottle for 4 hours. Both dry clay and clay containing 12% water were used. Thus, the treated clay contained 12.5% sodium hexametaphosphate.[1] The samples were then stored at 125 and 150° F. for 28 days after which they were analyzed for Dyfonate content. The results of this test are illustrated in Table II.

[1] Sold under trade name Calgon.

TABLE II

| Additives to clay | Percent Dyfonate on clay after 28 days | |
|---|---|---|
| | 125° F. | 150° F. |
| 2% Dyfonate and 12% H₂O | 1.42 | 1.24 |
| 20% Dyfonate and 12% H₂O | 18.42 | 17.54 |
| 2% Dyfonate | 0.45 | 0.27 |
| 20% Dyfonate | 15.10 | 12.83 |
| 2% Dyfonate plus 12.5% SHMP * plus 12% H₂O | | 1.96 |
| 20% Dyfonate plus 12.5% SHMP * plus 12% H₂O | 19.80 | 18.88 |
| 2% Dyfonate plus 12.5% SHMP * | 1.72 | 1.30 |
| 20% Dyfonate plus 12.5% SHMP * | 17.80 | 16.82 |

*Sold under trade name Calgon.

What is claimed is:

1. A pesticidal composition comprising a solid particulate inert clay carrier having a mesh size between about 10 and 500, an inorganic alkali metal phosphate stabilizer present in an amount ranging between about 1.2 and 12.5% by weight of said carrier and from about 2 to about 20% by weight of an organic phosphate type toxicant, said inorganic alkali metal being selected from sodium.

2. A composition as set forth in claim 1 wherein said inorganic alkali metal is sodium hexametaphosphate.

3. A composition as set forth in claim 1 wherein said solid particulate inert clays are selected from the group consisting of attapulgite, kaolinite, montmorillonite, and mixtures thereof.

4. A process of forming solid particulate compositions comprising the steps of:
   (a) Adding a sufficient amount of water to a clay composition to form an extrudable paste;
   (b) Dissolving in said paste from about 1.2 to 12.5% by weight an inorganic alkali metal phosphate selected from sodium;
   (c) Pelletizing the paste to form granules.

5. A process as set forth in claim 4 wherein said inert alkali phosphate is sodium hexametaphosphate.

6. A process of killing insects comprising contacting the habitat of said insect with the composition of claim 3.

7. A process of killing insects comprising contacting the habitat of said insects with an effective amount of the composition of claim 3.

References Cited

UNITED STATES PATENTS

| 2,087,089 | 7/1937 | Hall | 424—128 |
| 2,962,418 | 11/1960 | Sawyer | 424—213 |
| 2,988,474 | 6/1961 | Szabo et al. | 424—222 |

OTHER REFERENCES

Chem. Abst., 53, 10690b (1959).
Chem. Abst., 53, 10689d (1959).
Chem. Abst., 54, 3903h (1960).

STANLEY J. FRIEDMAN, Primary Examiner

U.S. Cl. X.R.

424—357

FO-1050
(5/69)

UNITED STATES PATENT OFFICE
CERTIFICATE OF CORRECTION

Patent No. __3,658,988__    Dated __April 25, 1972__

Inventor(s) __Herbert B. Scher__

It is certified that error appears in the above-identified patent and that said Letters Patent are hereby corrected as shown below:

Column 1, line 39, before the word "carrier" insert the word "solid".

Column 1, line 65, the word "trilkanolamines" should read ---trialkanolamines---.

Column 2, line 16, after "attapulgite" insert --- , ---.

Column 2, lines 27 and 28, reading "compositions are added to this paste or water-clay compounds are readily soluble in water, they will be com-" should read ---compositions are added to this paste or water-clay combination. Since the alkali metal inorganic phosphate compounds are readily soluble in water, they will be com- ---.

Column 3, line 16, "1.2" should read ---1.2%---.

Column 4, line 2 of Claim 6, "claim 3" should read ---claim 2---.

Signed and sealed this 31st day of October 1972.

(SEAL)
Attest:

EDWARD M. FLETCHER, JR.
Attesting Officer

ROBERT GOTTSCHALK
Commissioner of Patents